United States Patent [19]

Dikinis

[11] 4,160,522

[45] Jul. 10, 1979

[54] AUTOMATIC CAR IDENTIFICATION SYSTEM

[76] Inventor: Daumantas V. Dikinis, 110-3B Seminary Dr., Mill Valley, Calif. 94941

[21] Appl. No.: 892,533

[22] Filed: Apr. 3, 1978

[51] Int. Cl.² .................... G06K 7/10; G06K 19/06; G08C 9/06
[52] U.S. Cl. .............................. 235/454; 235/473; 235/487; 250/566; 340/146.3 K
[58] Field of Search ............... 235/454, 456, 473, 487, 235/489; 250/555, 566; 340/146.3 K

[56] References Cited

U.S. PATENT DOCUMENTS

| | | | |
|---|---|---|---|
| 3,277,283 | 10/1966 | Rabinow et al. | 340/146.3 K |
| 3,502,851 | 3/1970 | Kakimoto et al. | 340/146.3 K |
| 3,952,629 | 5/1976 | Specht et al. | 340/146.3 K |

Primary Examiner—Daryl W. Cook
Attorney, Agent, or Firm—Townsend and Townsend

[57] ABSTRACT

A system for identifying a moving railway vehicle or any other object upon which is fastened an identification label having a number of vertical columns of light retransmitting medium, each column representing a digit number obtained by coding the column by insertion of a metal plate in front of the column. A wayside light transmitter/receiver unit provides a source of light beam directd toward the path of travel of the vehicle and also provides a light beam receiver responsive to retransmitted light signals from the label. The receiver decodes these signals using a control means such as a microprocessor and transmits all pertinent information in digital form to other data processing equipment employed by the user.

16 Claims, 7 Drawing Figures

AUTOMATIC CAR IDENTIFICATION SYSTEM

This invention relates to a system for identifying moving objects and in particular to a system for identifying moving railroad vehicles, including piggy-back carried trucks, trailers, or containers as they pass wayside transmitter/receiver stations.

BACKGROUND OF THE INVENTION

In prior systems, there are disclosed a number of arrangements for automatically identifying moving railroad vehicles. These include the use of microwaves, heat sensing devices, color coded light detectors, and alternate reflective and non-reflective variable width area labels. All of them have suffered from being unreliable and not meeting the specifications of the Association of American Railroads Automatic Car Identification (ACI).

Automatic car identification systems have been disclosed in a number of U.S. patents owned by Servo Corporation of America, Hicksville, N.Y. 11802. Representative of these patents are as follows: U.S. Pat. Nos. 3,225,117; 3,569,676; 3,587,050 and 3,646,324. Other U.S. patents in this field are; U.S. Pat. Nos. 3,253,126; 3,443,072; 3,543,007; 3,576,430; 3,610,940 and 3,700,859.

It is thus an object of this invention to provide a highly improved system for reliably and automatically identifying individual objects moving past a fixed reference point.

SUMMARY OF THE INVENTION

Briefly stated, this invention provides a system for identifying moving objects, such as railroad vehicles. The system includes a light source positioned at a wayside location. One or more light beams from this source are directed onto a label located on the moving object, such as a railroad vehicle. The label bends and retransmits the light beams from columns in the label in a predetermined code which identifies the specific vehicle. A light receiver at the wayside location receives the retransmitted light beams and, with the use of a control means, such as a microprocessor, analyzes the light beam pattern for each label column and stores this information in its memory in digital form for retransmittal to other data processing equipment at a later time.

Other objects of this invention, together with an understanding of the operation thereof, will become clear from the following description of the attached drawings, in which.

Figure 1:
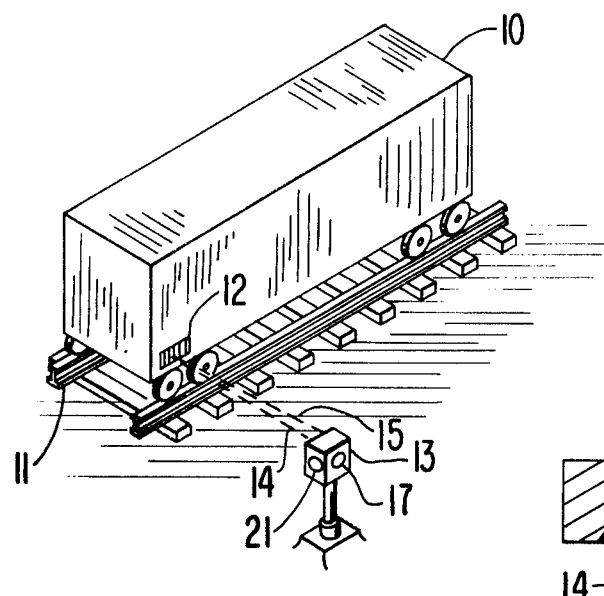
FIG. 1 is a perspective view of a railroad vehicle to one side of which is attached an improved identification label with the vehicle movable past a transmitter/receiver unit of the present invention.

FIG. 1 shows a railroad vehicle 10 on a track 11. An identification label 12 is attached to the side of the vehicle. Located at the wayside is a transmitter/receiver unit 13 having a light source 17 for transmitting light beams in directions transverse to the path of travel of vehicle 10. Unit 13 also has light sensitive receivers, such as a column of phototransistors 19 (FIG. 5) connected to electronic circuitry 21, such as an amplifier, wave shaper, switching network, microprocessor, memory and other components. A light beam column 14 (FIG. 1) is directed from the light source toward the label. The label is made so that it bends the light beam and retransmits it immediately back to unit 13 where it is received by the phototransistors. To code the label, light blocking means is placed on the front face of the label to allow retransmitted light beams from only certain locations on the label.

A retransmitted coded light beam column 15 (FIG. 1) consisting of up to four vertically spaced light beams in a column is retransmitted from the label to the receiver. "Light beam" as used herein means a beam of radiation, such as visible light, infra-red radiation, ultraviolet radiation and the like. An infra-red light beam is preferably used to provide higher beam intensity under severe weather conditions such as rain, fog, or snow.

The height and the width of the light beam column 14 depends on the operational tolerances specified by the user and is produced by employing standard beam-shaping techniques, such as lenses and slits. By using this type of light beam, the need for beam-moving rotating mirrors and other moving parts in the light beam transmitter is eliminated.

Figure 2:
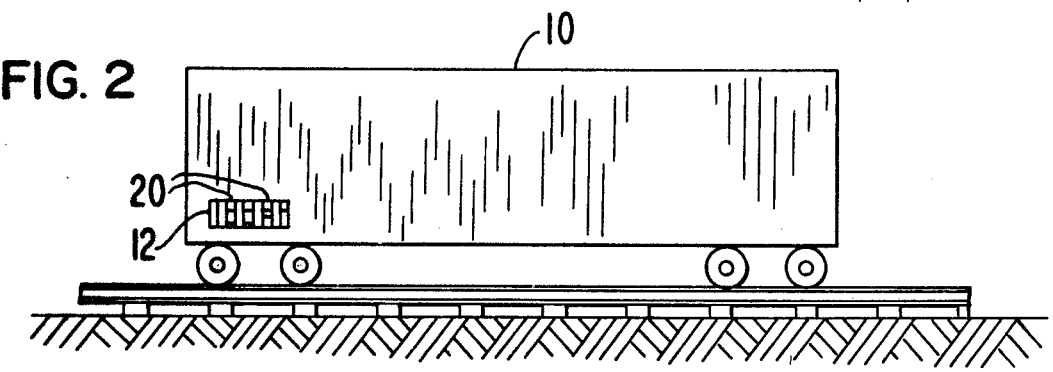
FIG. 2 is a side elevational view of the railroad vehicle showing its identification label with coded vertical columns representing individual digits.

FIG. 2 shows the label 12 attached to the railroad vehicle 10. The number of vertical columns 20 is determined by the number of digits required for vehicle identification. Present Association of American Railroads ACI specifications calls for a 12-digit identification number. Therefore, adding one column for vehicle direction information and one column for identification number validity check, a total of 14 columns will be employed, only five of which are shown in FIG. 2 to simplify the drawing.

Figure 3A:
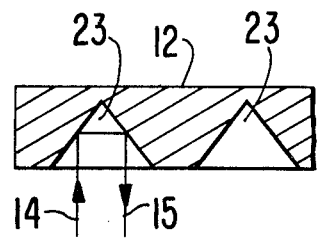
FIG. 3a is an enlarged fragmentary, cross sectional view taken along line 3a—3a of FIG. 3.
Figure 3:
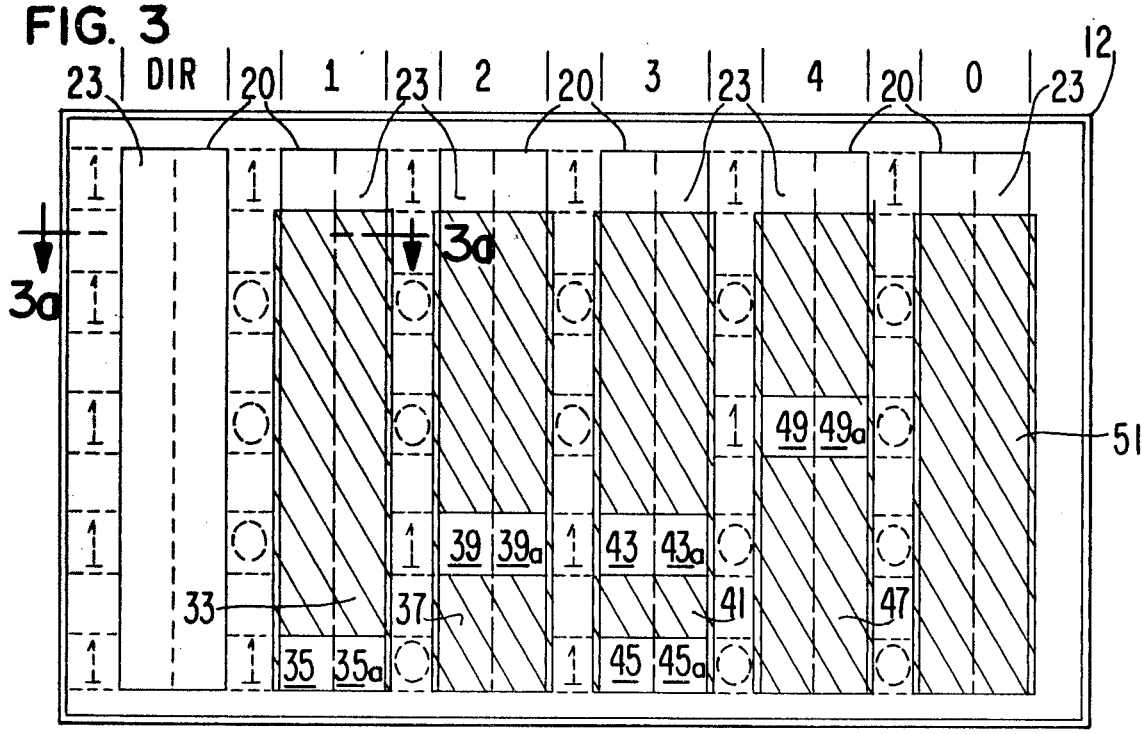
FIG. 3 shows the label as having six vertical columns.

The vertical columns for this label are made of clear plastic or clear glass prisms 23 (FIGS. 3 and 3a). A 45° light retransmitting prism is used. The overall height of the prism is determined by the type of coding used. Here a binary coded decimal (BCD) system is shown. The BCD system requires four discrete logic one (1) or zero (0) bits to represent numbers from zero to 15 as shown below:

```
 0-0000
 1-0001
 2-0010
 3-0011
 4-0100
 5-0101
 6-0110
 7-0111
 8-1000
 9-1001
10-1010
11-1011
12-1100
13-1101
14-1110
15-1111
```

FIG. 3 shows an identification label 12 having six vertical columns. The first column on the left is never coded i.e. has no light blocking means along its length. This first column provides information on the direction in which the car moves. The other five columns are shown, and they are coded by the use of light-blocking plates of metal, plastic or the like which are inserted in front of respective columns. The plates are arranged to provide ports to allow light to pass into and out of the prisms 23. For instance, plate 33 has an entrance port 35 and an exit port 35a at the BCD "1" position; plate 37 has a entrance port 39 and an exit port 39a at the BCD "2" position; plate 41 forms two sets of entrance and exit ports 43, 43a, 45 and 45a, at the "1" and "2" positions respectively, so that the two port sets represent a BCD "3"; plate 47 has an entrance port 49 and an exit port 49a at the "4" position; and plate 51 has no ports and covers the right-hand column except at the upper end of the column. The code shown in FIG. 3 indicates an identification number "12340". The dotted "ones" (1) and "zeros" (0) shown on the label in FIG. 3 are for reference only to clarify further discussion.

One more logic one (1) bit is added to each column to provide a reference point for the microprocessor for reading each digit's code. Thus numeral 1 is represented by 10001 logic bits as shown by dotted numerals 32 read vertically downwardly in the numeral column to the left of each column covered by a plate. The height of the retransmitting light beam representing logic one (1) bit is made such as to activate four phototransistors or photodiodes 19 (FIG. 5) which are part of the receiver system.

Since the phototransistor or photodiode diameter is about 0.087 inches and the phototransistors are spaced 0.100 inch center-to-center in a vertical column, the four phototransistors will take up about 0.4 inches of column height. Separating logic "1" bit light beams by 0.5 inch, the total height of each prism 23 will be about 0.5 inches. By making the prism base 0.5 inch wide, the fourteen prisms will require only 7 inches in width. Thus a fourteen column identification label can be made with dimensions of about 10 inches by 6 inches.

The coding plates are punched out or otherwise provided with ports to represent each desired logic numeral 1 through 15. The plates are then inserted in front of the prisms in the field in any suitable manner, such as by an adhesive, thereby requiring no special tools. On each plate, the actual numeral is stamped, thus providing visual inspection of the completed label for errors without any special test equipment.

The first left column on the label is never coded, i.e., no plate is used to cover the column and, therefore, retransmits an entire light beam 4 inches high. If the vehicle is moving to the left, the appropriate phototransistors 19 carried by unit 13 will read the direction column first, then the twelve identification numerals and lastly, the validity check numeral. The signals generated by the light striking the phototransistors will be suitably amplified, shaped, stored and otherwise handled by electronic circuitry 21 so that the signals can be used to identify the various vehicles passing unit 13. Specifically, the circuitry will store the information that each vehicle is moving to the left, perform the identification validity check of the vehicle code and, if the identification code is found to be valid, will store all twelve numerals in BCD form in a memory forming part of the circuitry.

If the vehicle is moving to the right, the readings will take place in the reverse order. When the direction column is read last, the circuitry will automatically reverse the order in which the twelve identification numerals are read. It will store the information that the vehicle is moving to the right, perform the validity check of the vehicle code and, if the identification code is found to be valid, will store all twelve numerals in BCD form in the right order. The vehicle speed is calculated by a microprocessor forming part of the circuitry by simply measuring the elapsed time between the reading of each pair of adjacent columns.

The label assembly, using glass prisms 23 encapsulated in high temperature epoxy and metal coding plates, forms an extremely durable and high temperature resistant label. Such a label meets an Association of American Railroads ACI specification requirement for the label to withstand 500° F. for 20 minutes.

Figure 4B:
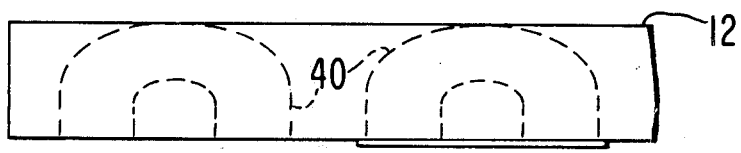
FIG. 4a and 4b show side and top views, respectively, of a section of a label where the columns are formed by employing fiber optic U-shaped segments.
Figure 4A:
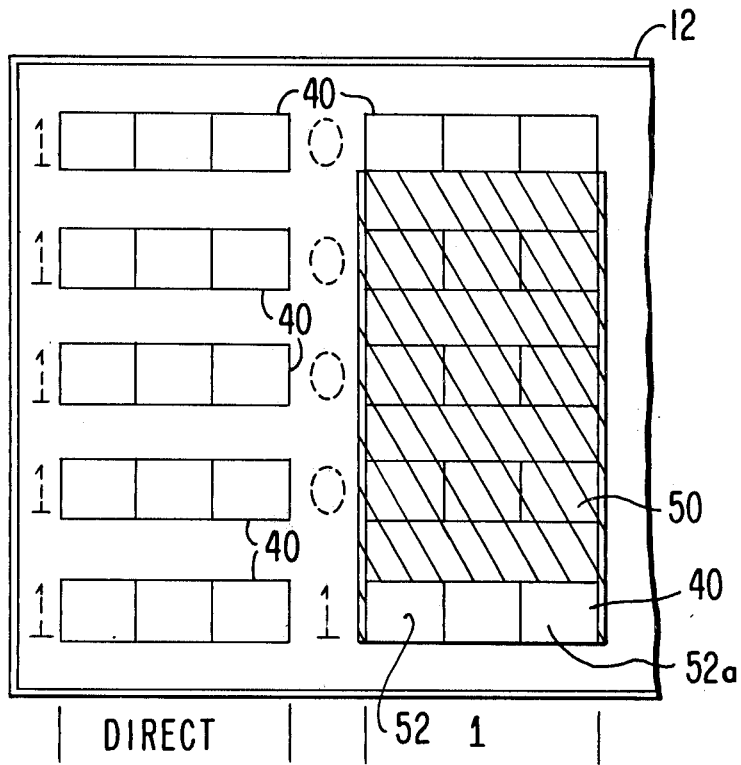

FIGS. 4a and 4b show front and top views of a section of another form of label 12. The columns for this label are formed by placing five U-shaped, vertically spaced fiber optics segments in a stack 40. Each segment 40 is in a horizontal plane. The coding and overall assembly of a label made with segments 40 are accomplished with plates in the same manner as described in FIG. 3. Plate 50 is shown in FIGS. 4a and 4b to illustrate its use in forming entrance and exit ports 52 and 52a at the logic 1 position.

The light beam enters each fiber optics segment 40 through one end and is retransmitted back to the receiver through the other. The direction sensing column here will generate logic bits 11111 which also are for numeral 15. However, the numeral 15 is never used in the system and, therefore, can be used as direction detector.

Figure 5:
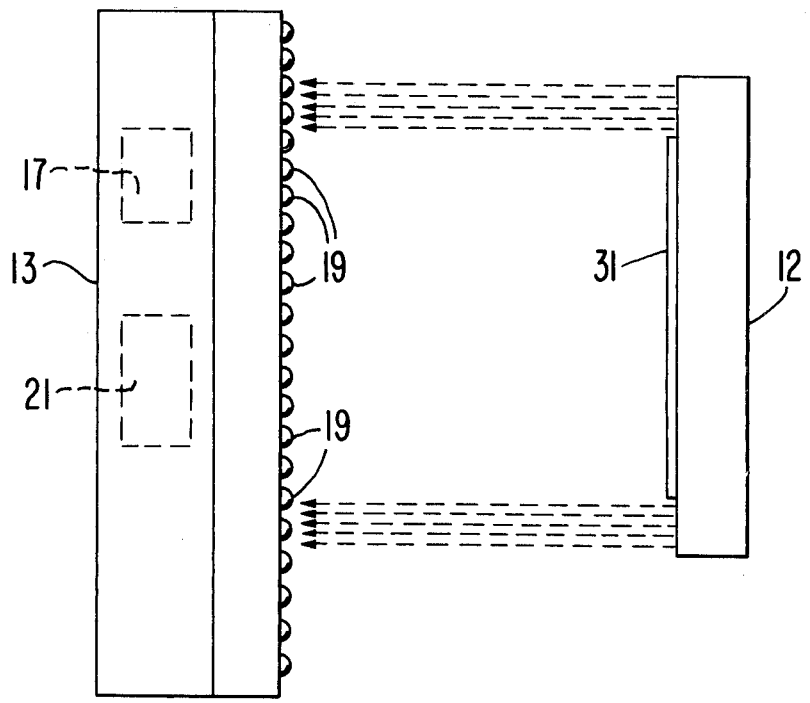
FIG. 5 shows side views of a receiver and a label column coded for the digit 1, the retransmitted light beam pattern being indicated as dashed lines.

The vehicle speed is calculated by a microprocessor or the like in the same manner as using the label described in FIG. 3. FIG. 5 shows a single column made of prisms and coded with a metal plate 31 to produce binary code 10001 representing numeral 1. In this case two light beams vertically separated by the height of the coding plate 31 will be retransmitted to the receiver assembly 21 having a vertical column of phototransistors or photodiodes 19. The number of phototransistors used in the column depends on the vertical operational tolerance specified for the system. The Association of American Railroads ACI specification calls for plus or minus 6.5 inches vertical operational tolerance for labels attached to railway cars. By adding 4 inches for the height of the prism as described in FIG. 3, the total phototransistor column height is 17 inches. Since 10 phototransistors can be assembled in one inch, a total of 170 phototransistors can be used in the receiver.

Since Mean Time Between Failure (MTBF) for this type phototransistor is in the range of hundreds of thousands of hours, the reliability of the system for the 170 phototransistor assembly is still well above the ACI specification requirements. Since the logic 1 light beam actuates four phototransistors, the failure of one or two adjacent phototransistors will not constitute a system failure as can be seen from the operational description that follows.

The direction sensing column will retransmit the light beam 4 inches high. This light beam, therefore will actuate 40 phototransistors. The control means of the circuitry will scan the status of all phototransistors. When it counts 35 to 40 phototransistors activated in a continuous column, it interprets this as being a direction sensing signal. If only one or two adjacent phototransistors are not actuated within this 40-transistor column, this fact will be ignored by the control means and the directional signal will be considered valid and therefore will be stored as such.

It should be apparent that the total number of phototransistors used in a column is a matter of desired redundancy. As few as 35 phototransistors can be used, thus providing 0.5 inch spacing between each phototransistor.

It also is apparent that, if desired, the phototransistors and the control means, such as a microprocessor, can be located remotely from transmitter/receiver unit 13. In this case, the phototransistors in the transmitter/receiver unit wil be a fiber-optics assembly which could be connected to a remote decoder unit through fiber optics cable. The number of fiber optic cables is determined by the number of phototransistors used in decoder.

Consider now that a column coded for numeral 1 is retransmitting the light beams as shown in FIG. 5. The control means will first detect the top four activated phototransistors and then will count the number of deactivated phototransistors below until it detects a group of four more activated phototransistors. If a number of deactivated phototransistors between the two activated groups is counted to be 30, the microprocessor will interpret this as being numeral 1. This same approach is applied to calculate all other numerals.

I claim:

1. A system for identifying objects moving along a path past a stationary location comprising: means adapted to be placed at said location for defining a source of a radiation beam, said defining means being operable to direct a radiation beam in the form in a generally vertical column across the path of travel of the moving object when the source is at said location; a label adapted to be mounted on an object moveable along said path for identifying the same, the label having at least a pair of side-by-side radiation receiving and transmitting columns alignable across the path of the radiation beam when the label is on the object and when the source is at said location, each column having means selectively located thereon for blocking at least a portion of the light beam to thereby define a radiation entrance port and a radiation exit port for the column, each column further having radiation transmitting means therein for connecting the entrance and exit ports thereof so that a radiation beam entering the entrance port can pass into the column and exit therefrom at the exit ports; and radiation receiving means adapted to be placed at said location adjacent to said radiation source for receiving the radiation beam leaving each column through the exit port thereof, said radiation receiving means being operable to generate electronic signals in response to the radiation transmitted from each column, whereby the locations of the entrance and exit ports relative to a specific reference point on the corresponding column, provide a coded identification for each object to distinguish it from other objects moving past the location.

2. A system as set forth in claim 1, wherein the label has a plurality of side-by-side prisms defining respective columns.

3. A system as set forth in claim 2, wherein each prism has a front face, said blocking means including an opaque plate coupled to the face in at least partial blocking relationship to radiation directed from the source toward the column.

4. A system as set forth in claim 1, wherein said label is formed from a plurality of fiber optics bundles, each bundle having a pair of opposed end faces permitting radiation to enter and leave the bundle, respectively.

5. A system as set forth in claim 4, wherein the fiber optics bundles are substantially U-shaped segments arranged in a vertical stack to define a respective column.

6. A system as set forth in claim 4, wherein said blocking means comprises a plate for blocking the end faces of at least certain of the fiber optics bundles.

7. A system as set forth in claim 1, wherein said light receiving means includes a column of photosensors, the height of the photosensors column being at least substantially equal to the height of the columns of the labels.

8. A system as set forth in claim 1, wherein said source is an infra-red source.

9. A system as set forth in claim 1, wherein said label has a plurality of columns, one of the columns being at one end of the label and being free of said blocking means, each of the other columns having said blocking means thereon.

10. In a system for identifying objects moving along a path past a stationary location having a radiation source operable to direct a radiation beam across the path and radiation receiving means for receiving radiation transmitted from the object and converting the transmitted radiation to electronic signals, the improvement comprising: a lable adapted to be mounted on an object moveable along said path for identifying the same, the label having at least a pair of side-by-side radiation receiving and transmitting columns alignable across the path of the radiation beam when the label is on the object, each column having means for blocking at least a portion of the light beam to thereby define a radiation entrance port and a radiation exit port for the column, each column further having radiation transmitting means therein for connecting the entrance and exit ports so that a radiation beam entering the entrance port can pass into the column and exit therefrom at the exit ports to said receiving means at said location, whereby the electronic signals will be generated by said receiving means and the location of the entrance and exit ports relative to a specific reference point on the corresponding column will provide a coded identification for each object to distinguish it from other objects moving past the location.

11. A system as set forth in claim 10, wherein the label has a plurality of side-by-side prisms defining respective columns.

12. A system as set forth in claim 11, wherein each prism has a front face, said blocking means including an opaque plate coupled to the face in at least partial blocking relationship to radiation directed from the source toward the column.

13. A system as set forth in claim 10, wherein said label is formed from a plurality of fiber optics bundles, each bundle having a pair of opposed end faces permitting radiation to enter and leave the bundle, respectively.

14. A system as set forth in claim 13, wherein the fiber optics bundles are substantially U-shaped segments arranged in a vertical stacks to define a respective column.

15. A system as set forth in claim 14, wherein said blocking means comprises a plate for blocking the faces of at least certain of the fiber optics bundles.

16. A system as set forth in claim 10, wherein said label has a plurality of columns, one of the columns being at one end of the label and being free of said blocking means, each of the other columns having said blocking means thereon.

* * * * *